US011193579B2

(12) United States Patent
Twa et al.

(10) Patent No.: US 11,193,579 B2
(45) Date of Patent: Dec. 7, 2021

(54) VEHICLE SHIFTER HAVING A TOGGLE CAM WITH NEUTRAL LOCK (71) Applicant: GHSP, Inc., Grand Haven, MI (US)

(72) Inventors: Nathaniel Gerrit Twa, West Olive, MI (US); Samuel Eugene Wachowski, Grand Haven, MI (US); Bradley Allan Tharp, Grand Haven, MI (US); Daniel Sheldon Kushner, Ada, MI (US)

(73) Assignee: GHSP, Inc., Grand Haven, MI (US)

( * ) Notice: Subject to any disclaimer, the term of this patent is extended or adjusted under 35 U.S.C. 154(b) by 80 days.

(21) Appl. No.: 16/819,860

(22) Filed: Mar. 16, 2020

(65) Prior Publication Data

US 2020/0292061 A1    Sep. 17, 2020

Related U.S. Application Data (60) Provisional application No. 62/818,825, filed on Mar. 15, 2019.

(51) Int. Cl.
*F16H 59/10* (2006.01)
*F16H 59/02* (2006.01)

(52) U.S. Cl.
CPC ....... *F16H 59/10* (2013.01); *F16H 2059/026* (2013.01); *F16H 2059/0295* (2013.01)

(58) Field of Classification Search
CPC .......... F16H 61/18; F16H 61/16; F16H 61/22; F16H 2061/185; F16H 2061/161; F16H 2061/223; F16H 59/54; F16H 59/10; F16H 2059/6823; F16H 2059/026; F16H 2059/0252; F16H 2059/0295
USPC ..................................................... 74/473.25
See application file for complete search history.

(56) References Cited

U.S. PATENT DOCUMENTS

| 5,096,033 | A | * | 3/1992 | Osborn | F16H 59/10 192/220.7 |
| 7,568,404 | B2 | * | 8/2009 | Grossman | F16H 59/0204 74/473.21 |
| 2004/0079613 | A1 | * | 4/2004 | Cho | F16H 61/22 192/220.7 |
| 2016/0281841 | A1 | * | 9/2016 | Cimmino | F16H 59/0278 |
| 2017/0059039 | A1 | | 3/2017 | Mitteer et al. | |

FOREIGN PATENT DOCUMENTS

| EP | 315173 A1 | 5/1989 |
| EP | 400727 A1 | 12/1990 |
| WO | 2006014818 A2 | 2/2006 |

* cited by examiner

*Primary Examiner* — Jake Cook
*Assistant Examiner* — T. Scott Fix
(74) *Attorney, Agent, or Firm* — Price Heneveld LLP (57) ABSTRACT A vehicle shifter including a shift lever; a bracket that moves in response to the shift lever, and includes a neutral lock notch, a first outer surface and a second outer surface on either side of the neutral lock notch; a solenoid actuator movable between a first position and a second position; a blocker coupled to the solenoid actuator that moves the blocker between a neutral lock release position and a neutral lock position, the blocker including a neutral lock hook that, when in the neutral lock position, moves along the first and second outer surfaces and that selectively falls into the neutral lock notch to selectively prevent shifting out of the neutral position; and a toggle cam coupled to the bracket including a catch for engaging the neutral lock hook so as to prevent the neutral lock hook from sliding into the neutral lock notch.

20 Claims, 12 Drawing Sheets

VEHICLE SHIFTER HAVING A TOGGLE CAM WITH NEUTRAL LOCK

CROSS-REFERENCE TO RELATED APPLICATION

This application claims priority to and the benefit under 35 U.S.C. § 119(e) of U.S. Provisional Patent Application No. 62/818,825, filed on Mar. 15, 2019, entitled "VEHICLE SHIFTER HAVING A TOGGLE CAM WITH NEUTRAL LOCK," by Nathaniel Gerrit Twa et al., the entire disclosure of which is incorporated herein by reference.

FIELD OF THE INVENTION

The present invention generally relates to a shifter for a vehicle, and more particularly, relates to a vehicle shifter providing a gear selection function.

BACKGROUND OF THE INVENTION

In general, a requirement for mechanical shifters is to employ a park lock whereby a child cannot accidentally place the vehicle in gear without first depressing the brake pedal. Such park lock mechanisms have a fail-safe mode whereby if there is an electrical failure, the shifter locks the vehicle in park.

Vehicle shifters may also employ a neutral lock, which prevents shifting from neutral to drive or reverse while the vehicle is moving. The neutral lock mechanism would require that the vehicle stop moving before allowing the vehicle to be shifted from neutral into drive or reverse.

SUMMARY OF THE INVENTION

According to one aspect of the present invention, a shifter is provided for a vehicle, the shifter comprising a shift lever movable between park, reverse, neutral, and drive positions; a bracket that moves in response to the shift lever, the bracket including a neutral lock notch, a first outer surface and a second outer surface on either side of the neutral lock notch; a solenoid actuator movable between a first position and a second position; a blocker coupled to the solenoid actuator, wherein the solenoid actuator moves the blocker to a park lock position when in the first position whereby the shift lever cannot be moved from the park position, and wherein the solenoid actuator moves the blocker to a park lock release position when in the second position whereby the shift lever can be moved from the park position, the blocker comprising a neutral lock hook having a surface that, when the blocker is in the park lock release position, moves along the first outer surface and the second outer surface of the bracket and that selectively falls into the neutral lock notch to selectively prevent shifting out of the neutral position; and a toggle cam coupled to the bracket for rotating between a first location proximate the first outer surface of the bracket and a second location proximate the second outer surface of the bracket, the toggle cam comprising a catch for engaging the surface of the neutral lock hook as it slides on the first outer surface of the bracket towards the neutral lock notch as the shift lever is moved from the park position through the reverse position towards the neutral position so as to prevent the neutral lock hook from sliding into the neutral lock notch, wherein when the shift lever is shifted to the drive position, the neutral lock hook slides onto the second outer surface of the bracket thereby releasing the toggle cam to return to the first location.

According to one aspect of the present invention, a shifter is provided for a vehicle, the shifter comprising a shift lever movable between park, reverse, neutral, and drive positions; a bracket that moves in response to the shift lever, the bracket including a neutral lock notch, a first outer surface and a second outer surface on either side of the neutral lock notch; a solenoid actuator movable between a first position and a second position; a blocker coupled to the solenoid actuator, wherein the solenoid actuator moves the blocker to a neutral lock release position when in the first position, and wherein the solenoid actuator moves the blocker to a neutral lock position when in the second position, the blocker comprising a neutral lock hook having a surface that, when the blocker is in the neutral lock position, moves along the first outer surface and the second outer surface of the bracket and that selectively falls into the neutral lock notch to selectively prevent shifting out of the neutral position; and a toggle cam coupled to the bracket for rotating between a first location proximate the first outer surface of the bracket and a second location proximate the second outer surface of the bracket, the toggle cam comprising a catch for engaging the surface of the neutral lock hook as it slides on the first outer surface of the bracket towards the neutral lock notch as the shift lever is moved from the park position through the reverse position towards the neutral position so as to prevent the neutral lock hook from sliding into the neutral lock notch, wherein when the shift lever is shifted to the drive position, the neutral lock hook slides onto the second outer surface of the bracket thereby releasing the toggle cam to return to the first location.

According to one aspect of the present invention, a shifter is provided for a vehicle, the shifter comprising a shift lever movable between park, reverse, neutral, and drive positions; a cable bracket that moves in response to the shift lever, the cable bracket including a neutral lock notch, a first outer surface and a second outer surface on either side of the neutral lock notch; a solenoid actuator movable between a first position and a second position, wherein the solenoid actuator moves from the first position to the second position when a brake of the vehicle is actuated, wherein the solenoid actuator moves from the second position to the first position when the vehicle is not moving; a blocker coupled to the solenoid actuator, wherein the solenoid actuator moves the blocker to a park lock position when in the first position whereby the shift lever cannot be moved from the park position, and wherein the solenoid actuator moves the blocker to a park lock release position when in the second position whereby the shift lever can be moved from the park position, wherein the blocker is mounted so as to pivot between the park lock position and the park lock release position responsive to the solenoid actuator, the blocker comprising a neutral lock hook having a surface that, when the blocker is in the park lock release position, moves along the first outer surface and the second outer surface of the bracket and that selectively falls into the neutral lock notch to selectively prevent shifting out of the neutral position; and a toggle cam coupled to the bracket for rotating between a first location proximate the first outer surface of the bracket and a second location proximate the second outer surface of the bracket, the toggle cam comprising a catch for engaging the surface of the neutral lock hook as it slides on the first outer surface of the bracket towards the neutral lock notch as the shift lever is moved from the park position through the reverse position towards the neutral position so as to prevent the neutral lock hook from sliding into the neutral lock notch, wherein when the shift lever is shifted to the drive position, the neutral lock hook slides onto the second outer surface of the bracket thereby releasing the toggle cam to return to the first location.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Figure 1:
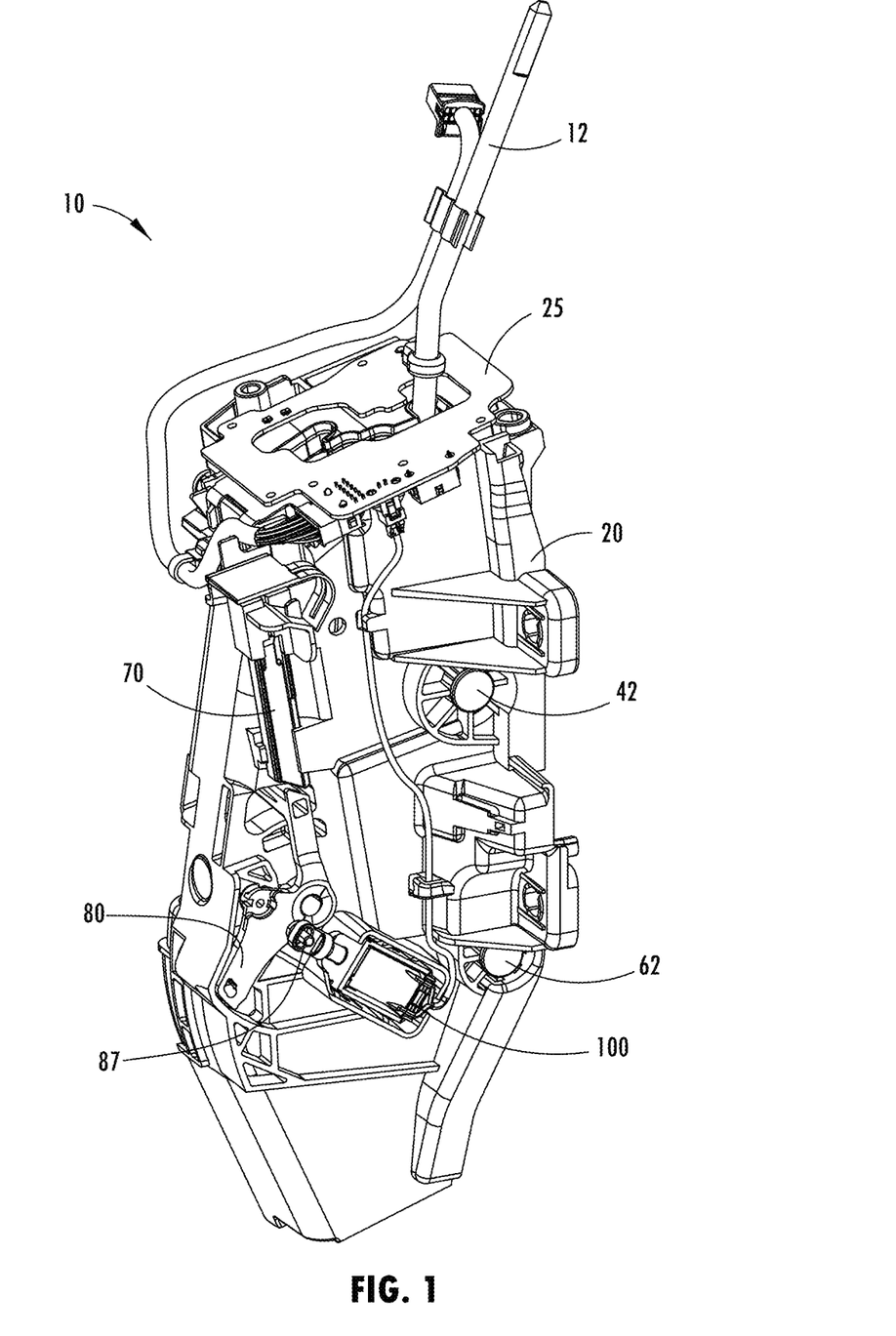
FIG. 1 is a perspective view of the top, side and rear of a vehicle shifter.

For purposes of description herein the terms "upper," "lower," "right," "left," "rear," "front," "vertical," "horizontal," and derivatives thereof shall relate to the device as oriented in FIG. 1 where the "front of the shifter is closer to the front of a vehicle in which the shifter is installed." However, it is to be understood that the device may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As noted above, prior shifters have employed a park lock feature and a neutral lock feature. The park lock prevents a child from accidentally placing the vehicle in gear by first requiring depression of the brake pedal. Such park lock mechanisms have a fail-safe mode whereby if there is an electrical failure, the shifter locks the vehicle in park. The neutral lock prevents shifting from neutral to drive or reverse while the vehicle is moving. The neutral lock mechanism would require that the vehicle stop moving before allowing the vehicle to be shifted from neutral into drive or reverse. The neutral lock protects the transmission. The fail-safe mode for the neutral lock is to keep the vehicle shifter from locking in neutral, but would allow the vehicle to be shifted into other gears including drive, in order to drive home or to another safe location in what is known as a "limp home" mode and to then place the vehicle in park.

Various mechanisms have been proposed to implement the park lock and neutral lock features that typically include separate solenoids for each feature. Fail-safe for park lock and neutral lock act in different manners, namely, when the vehicle is in park and there is an electrical failure, the vehicle should lock in park and if the vehicle is moving when there is an electrical failure, the vehicle should not lock in neutral, but should allow the driver to shift back to park. Thus, the fail-safes for park lock and neutral lock work in opposite directions; namely, one unlocks and the other locks and vice versa.

Using the vehicle shifter described below, when the driver depresses the brake pedal and shifts out of park, the shifter allows shifting from park to drive one time and only in that direction no matter how fast of a shift is made.

FIG. 1 shows a vehicle shifter 10 according to an embodiment of the present innovation. The vehicle shifter 10 includes a shift lever 12 that is movable between at least park, reverse, neutral, and drive positions. As shown, a housing 20 supports the various components of the vehicle shifter 10 and includes mounts for mounting the shift lever 12 to a vehicle. Although not shown, the vehicle shifter 10 may also include various trim components such as a shifter knob, a shift lever covering, and an indicia overlay that labels the various gear positions. As described in further detail below, the vehicle shifter 10 may also include a circuit board 25, a lever bracket pivot pin 42, a cable bracket pivot pin 62, a manual override plunger 70, a blocker 80, and a solenoid actuator 100 that is coupled to a solenoid connector pin 87 on the blocker 80.

Figure 2:
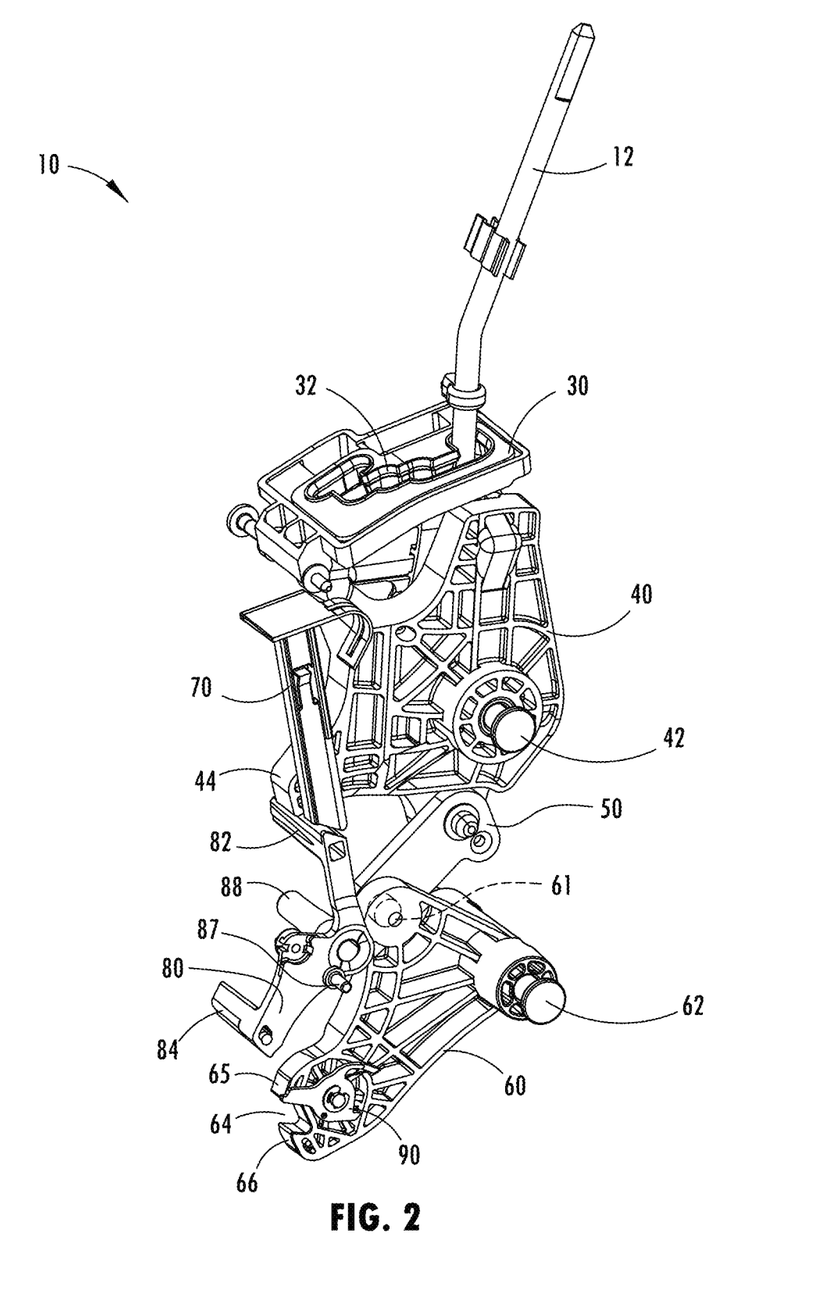
FIG. 2 is a perspective view of the top, side and rear of the internal components of the vehicle shifter of FIG. 1.
Figure 3:
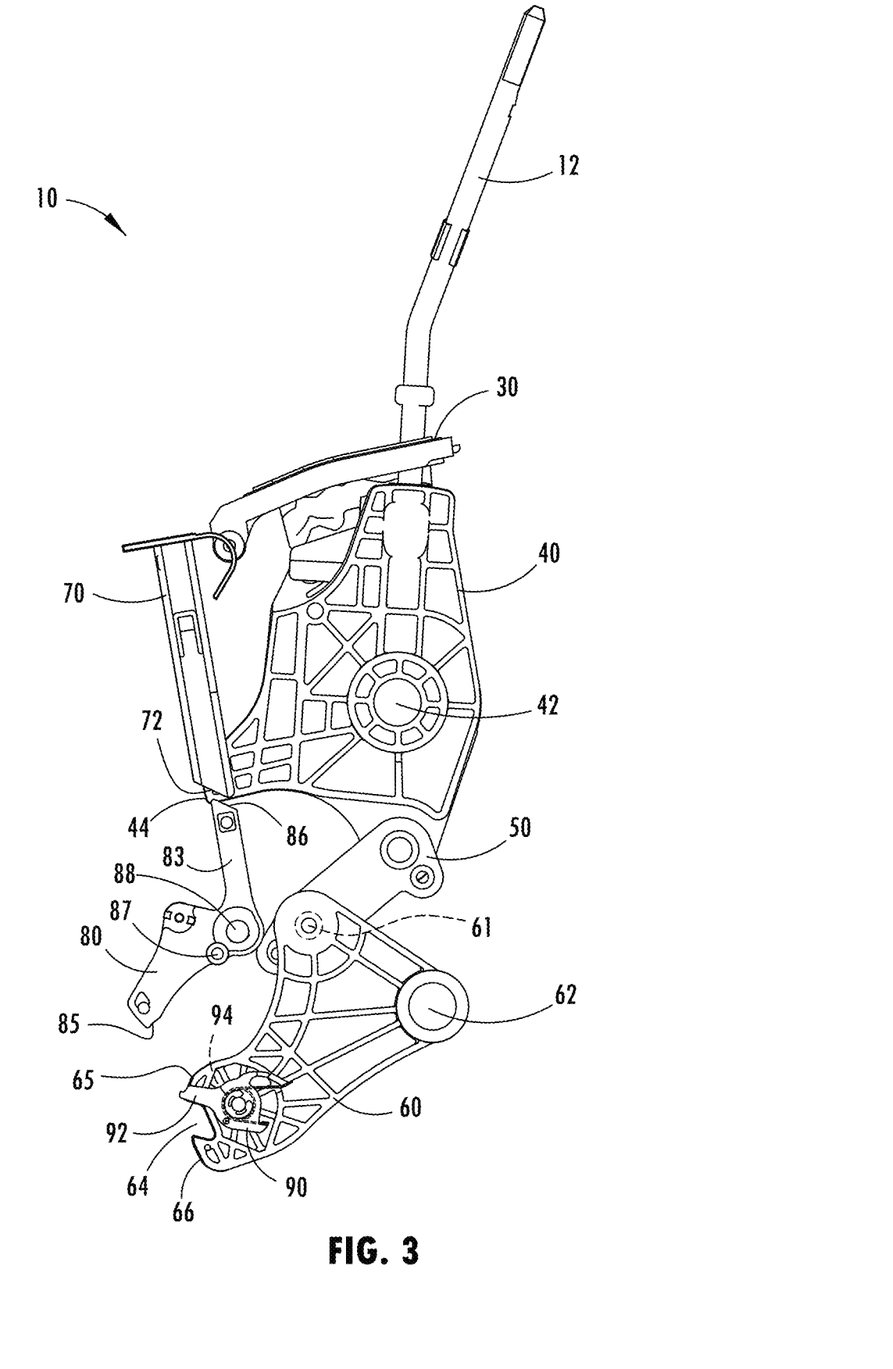
FIG. 3 is a side isometric view of the internal components of the vehicle shifter of FIG. 1.

FIGS. 2 and 3 show the internal components of the vehicle shifter 10 with the housing 20 and the circuit board 25 removed. In FIGS. 2 and 3, the vehicle shifter 10 is shown in the park position. The shifter 10 may include a guide plate 30 having a gear guide track 32 for defining the track through which the shift lever 12 may be moved between the park, reverse, neutral and drive positions. Manual shift plus and minus gear positions may also be provided.

The shifter 10 may also include a lever bracket 40, which is secured to the shift lever 12 and pivots about the lever bracket pivot pin 42 extending through the housing 20. The shifter 10 may further include a cable bracket 60 that pivots about the cable bracket pivot pin 62 extending through the housing 20. A linkage arm 50 is coupled to the cable bracket 60 via a cable bracket linkage pin 61 so as to link the cable bracket 60 to the lever bracket 40. Thus, as the shift lever 12 is moved between gear positions, the lever bracket 40 pivots about the pin 42, which causes the cable bracket 60 to pivot about the pin 62 through the linkage arm 50.

As noted above, the shifter 10 also includes a blocker 80. The blocker 80 is pivotably mounted to the housing 20 via a pivot 88 and has a park lock blocking arm 82 (FIG. 2) that engages a park lock leg 44 extending from the lever bracket 40 when in a park lock position (or neutral lock release position). The shifter 10 is illustrated in FIGS. 2 and 3 in the park lock condition whereby the blocking arm 82 of the blocker 80 engages the park lock leg 44 thereby preventing rotation of the lever bracket 40 and hence movement of the shift lever 12 out of the park position. The blocker 80 may be maintained in this park lock position until such time that the driver presses the brake pedal of the vehicle whereby a corresponding signal is received by a controller on the circuit board 25, which then controls the solenoid actuator 100 to move from a first position to a second position such that the blocker 80 is moved to a park lock release position (or neutral lock position) (FIGS. 7-13).

Also included in the shifter 10 is a manual override plunger 70 having a sloped engagement surface 72 for selectively engaging a sloped surface 86 of the blocking arm 82 of the blocker 80. The manual override plunger 70 may be manually actuated for towing purposes to release the park lock so that the vehicle may be shifted to neutral when otherwise disabled. The sloped engagement surface 72 pushes the blocking arm 82 out from under the park lock leg 44 thereby allowing the lever bracket 40 to rotate and the shift lever 12 to be moved.

As described further below, the blocker 80 not only functions as a park lock mechanism, but also functions as a neutral lock mechanism. This avoids the need for separate mechanisms each moved by separate actuators. The blocker 80 may thus include a neutral lock hook 84 that may selectively engage a neutral lock notch 64 provided in the cable bracket 60 as described in detail below. The cable bracket 60 may include a first outer surface 65 on one side of the neutral lock notch 64 and a second outer surface 66 on the other side of the notch 64. A surface 85 of the neutral lock arm 84 may slide along surfaces 65 and 66 and may engage notch 64. A toggle cam 90 having a catch 92 may selectively engage the neutral lock arm 84 so as to selectively prevent the neutral lock arm 84 from engaging the neutral lock notch 64 as described in detail below. Although the neutral lock notch 64 is described as being provided in the cable bracket 60, it may instead be included in the lever bracket 40 or the linkage arm 50, and the blocker 80 may be configured to instead engage with the lever bracket 40 or linkage arm 50.

Figure 4:
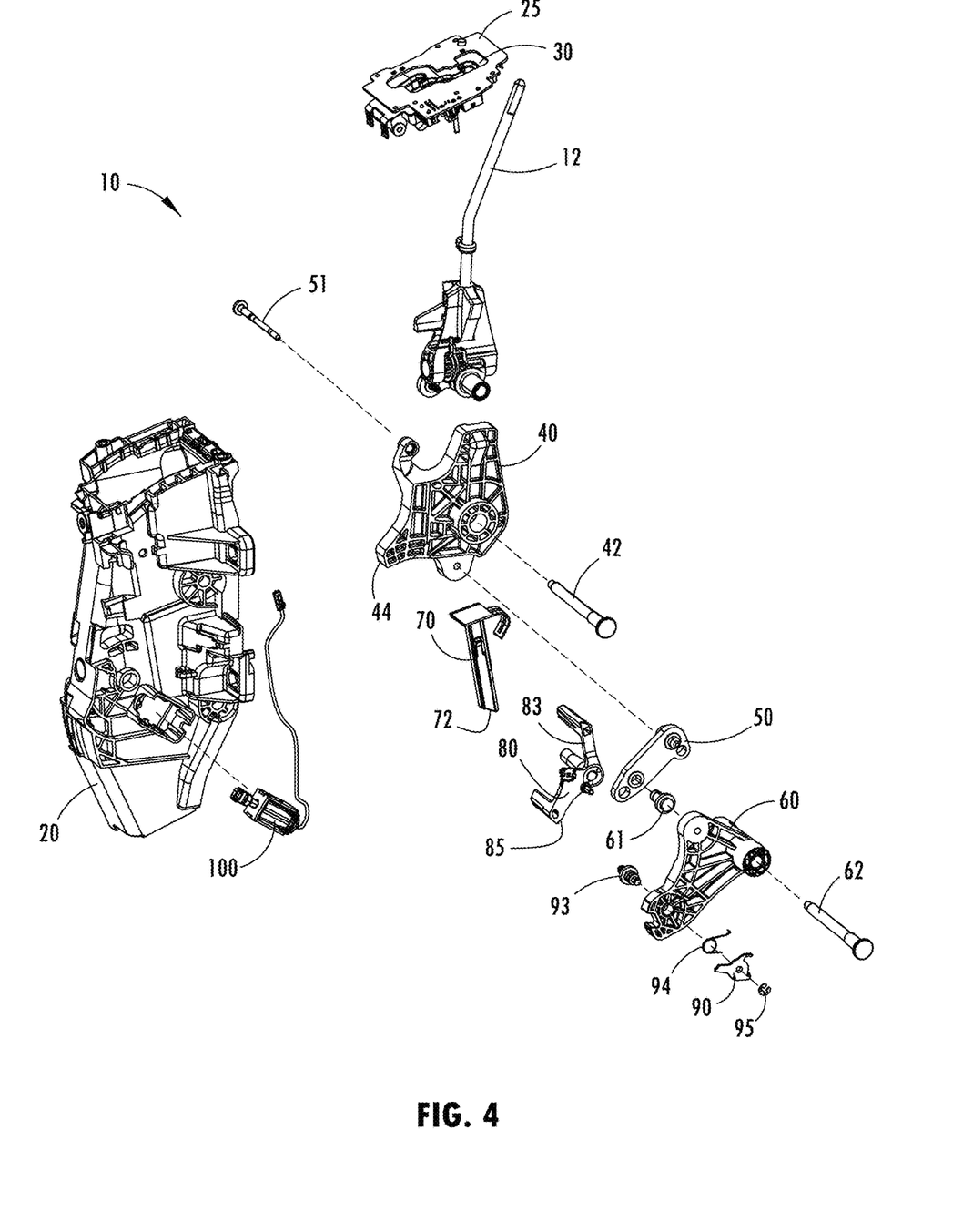
FIG. 4 is an exploded perspective view of the vehicle shifter of FIG. 1.

FIG. 4 shows an exploded perspective view of the components of the shifter 10. Additional components shown in FIG. 4 include: a pin 51 for coupling the linkage arm 50 to the lever bracket 40; a toggle cam pivot pin 93 that mounts the toggle cam 90 to the cable bracket 60; a spring 94 that biases the toggle cam 90 to a first location; and a retaining collar 95 for retaining the toggle cam 90 on the pivot pin 93. The pivot pin 93 may extend out the opposite side of the cable bracket 60 for facilitating connection of a cable (not shown) that mechanically couples the shifter 10 to the vehicle transmission. The cable may be moved by the cable bracket 60 in response to movement of the shift lever 12. Although a mechanical linkage to the transmission is shown, the present innovations may be applied to an e-shifter whereby electrical sensors are provided to sense movement and/or the position of a bracket (such as the lever bracket or the cable bracket) and to generate electrical signals corresponding to the position that are delivered to the vehicle transmission for a shift by wire application.

Figure 5:
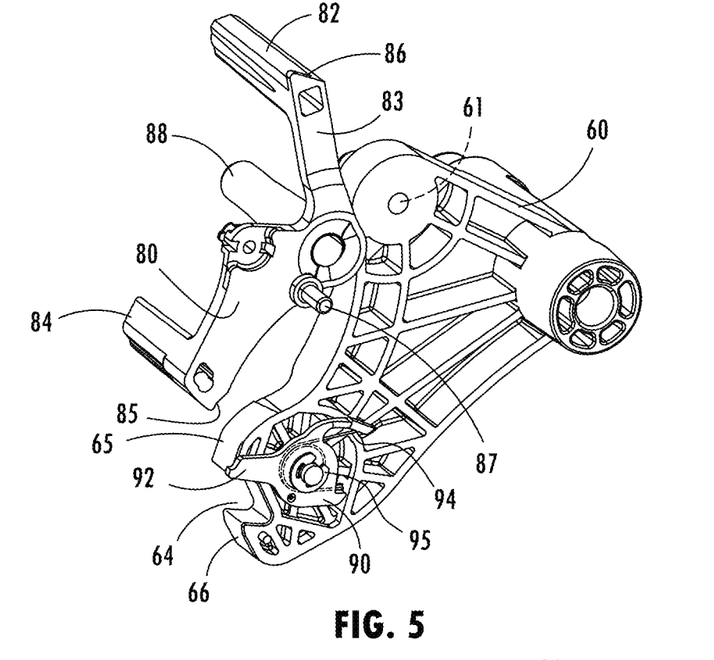
FIG. 5 is a perspective view of a cable bracket, blocker and toggle cam of the shifter of FIG. 1.
Figure 6:
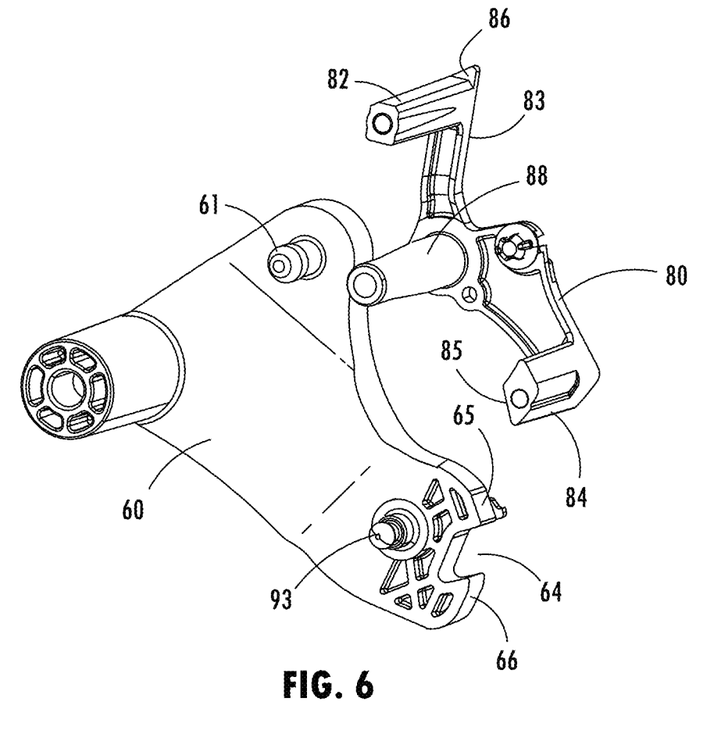
FIG. 6 is a perspective view of a cable bracket, blocker and toggle cam of the shifter of FIG. 1.

FIGS. 5 and 6 show perspective views of the cable bracket 60, the blocker 80, and the toggle cam 90 from opposite sides. As shown, the blocker 80 includes a park lock extension 83 that extends substantially vertically upward from pivot 88 when in the park lock position. The park lock arm 82 extends substantially horizontally from the end of the extension 83. The neutral lock hook 84 also extends substantially horizontally from the blocker 80 at a distance from the pivot 88. The solenoid connection pin 87 is located off center from the pivot 88 so as to establish leverage for the solenoid actuator to cause the blocker 80 to pivot.

Figure 7:
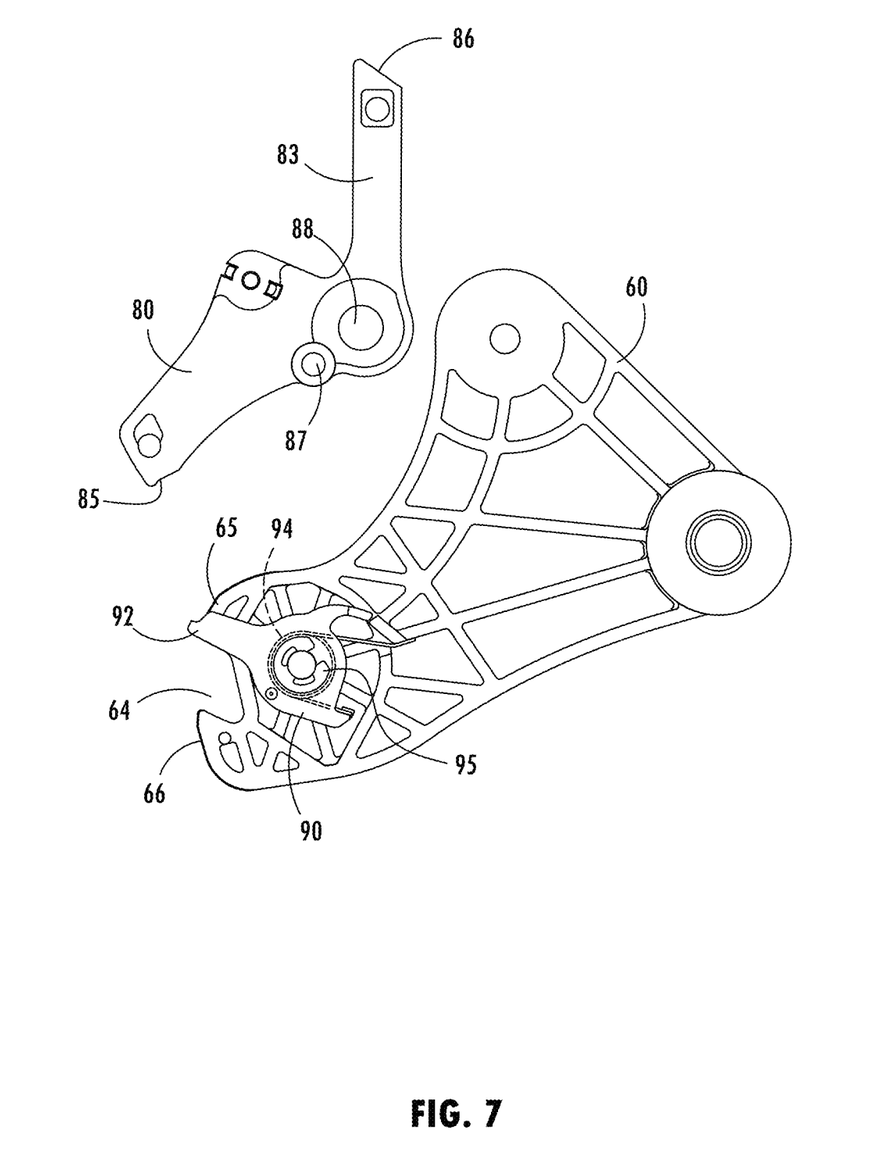
FIG. 7 is a side isometric view of the cable bracket, blocker and toggle cam of the shifter of FIG. 1 when in a park lock position and when the shift lever is in a park position.
Figure 8:
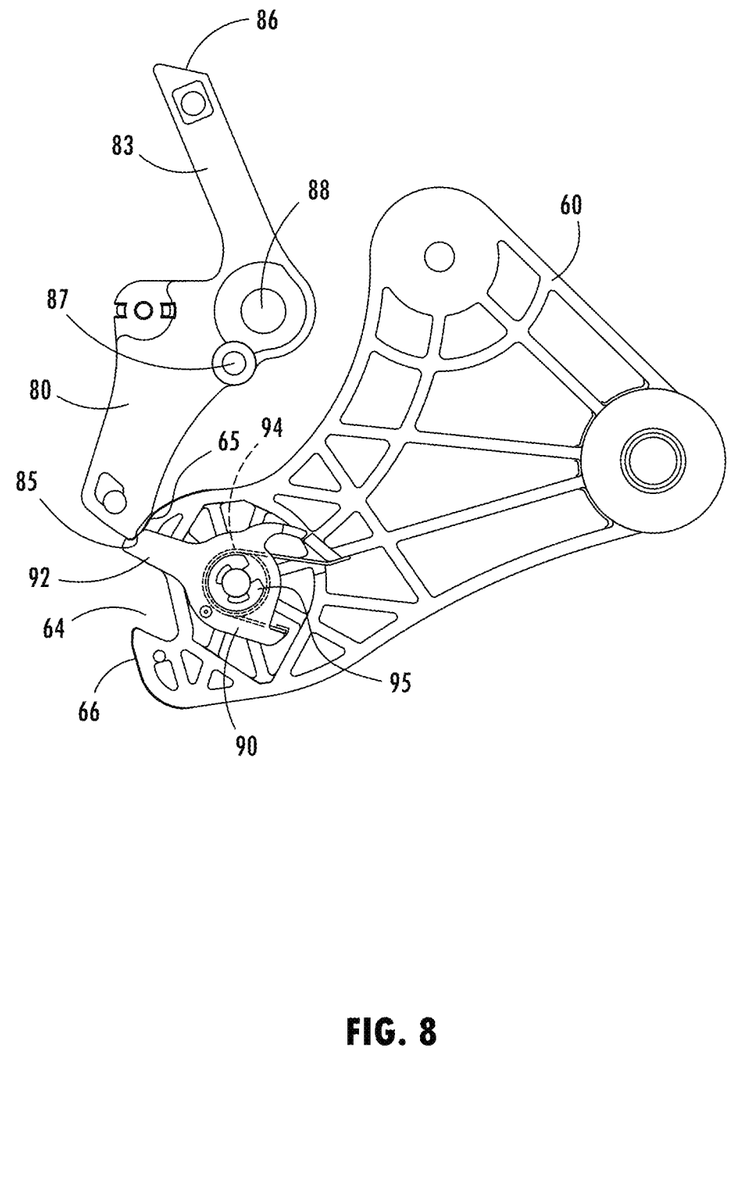
FIG. 8 is a side isometric view of the cable bracket, blocker and toggle cam of the shifter of FIG. 1 when the shift lever is between the park and reverse positions.

FIG. 7 shows the relative positions of the blocker 80, the cable bracket 60, and the toggle cam 90 with the shift lever 12 in park with the park lock engaged. FIGS. 8-13 show the initial movement of the blocker 80, the cable bracket 60, and the toggle cam 90 as the shift lever 12 is shifted out of park and into drive. The solenoid actuator 100 is powered to release the park lock when the brake pedal is pressed, which moves park lock blocking arm 82 out from under the park lock leg 44 thereby allowing the shift lever 12 to be moved out of park towards the reverse position. At this point, the solenoid actuator 100 has moved the blocker 80 such that the lower surface 85 of the neutral lock hook 84 slides along the first outer surface 65 of the cable bracket 60 and engages the catch 92 of the toggle cam 90 as shown in FIG. 8.

Figure 9:
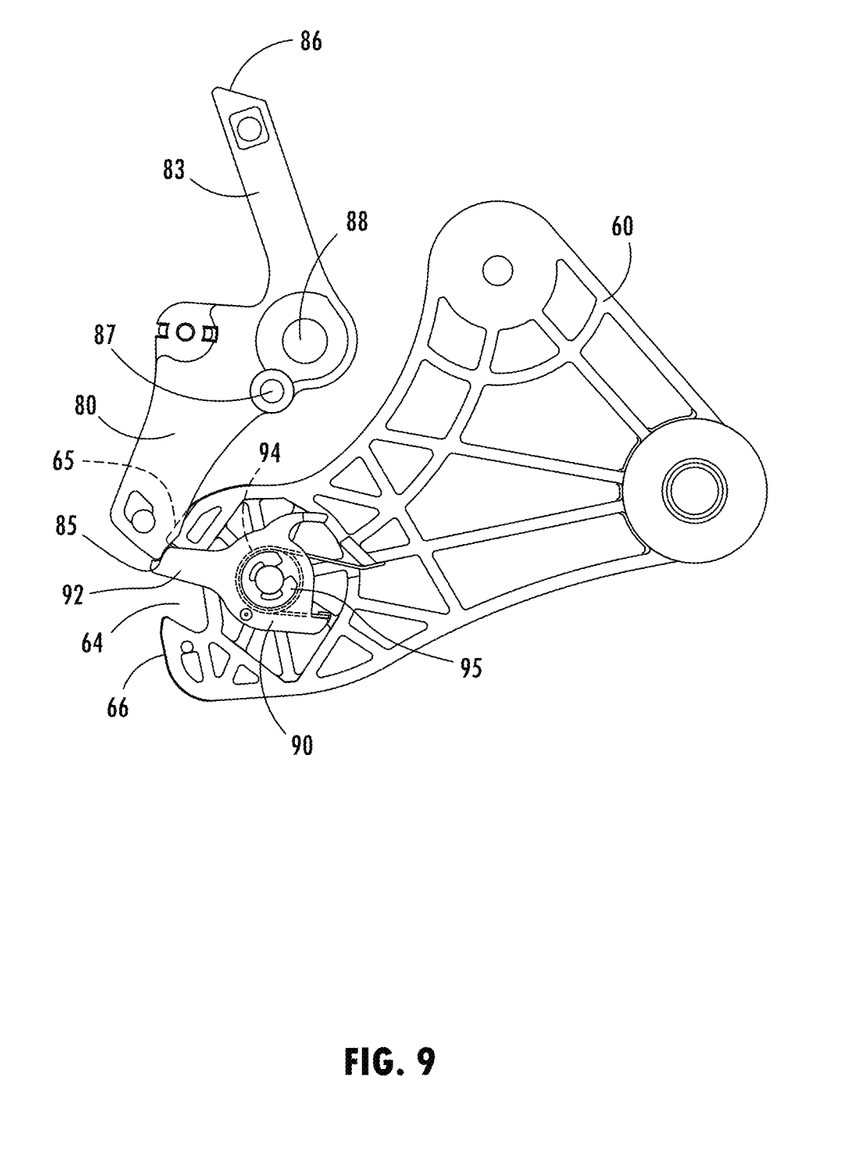
FIG. 9 is a side isometric view of the cable bracket, blocker and toggle cam of the shifter of FIG. 1 when the shift lever is in the reverse position.
Figure 10:
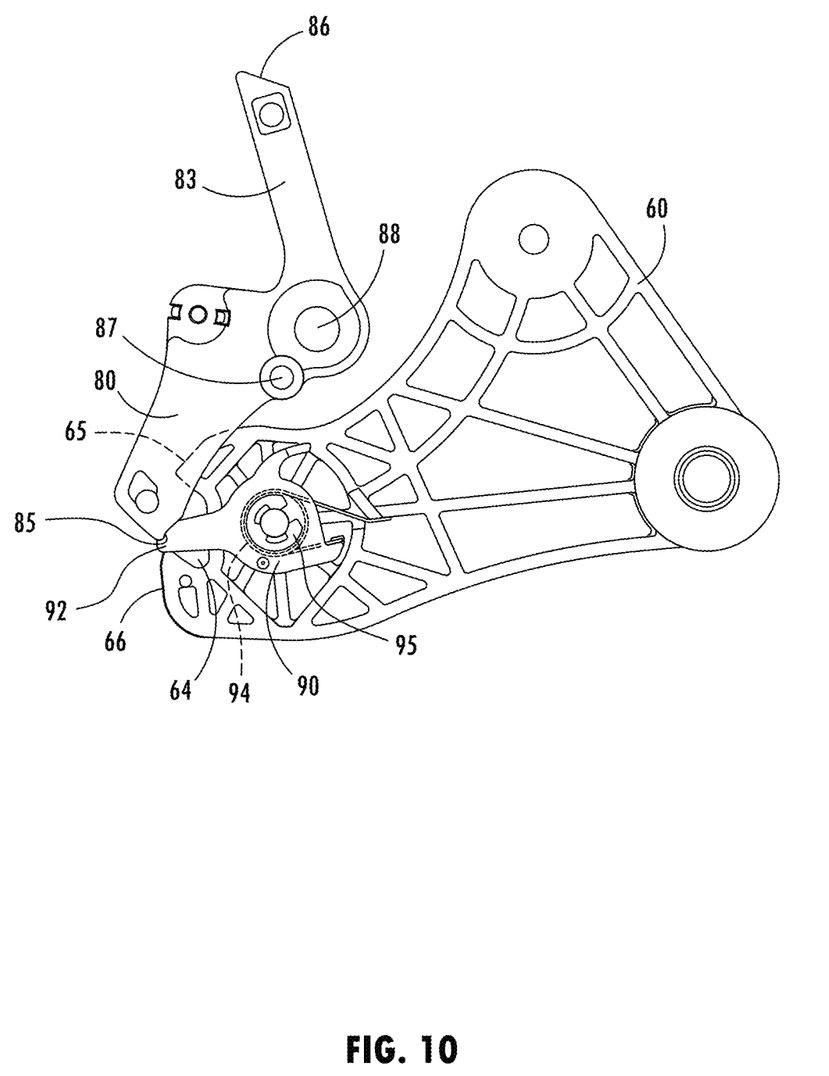
FIG. 10 is a side isometric view of the cable bracket, blocker and toggle cam of the shifter of FIG. 1 when the shift lever is in a neutral position.
Figure 11:
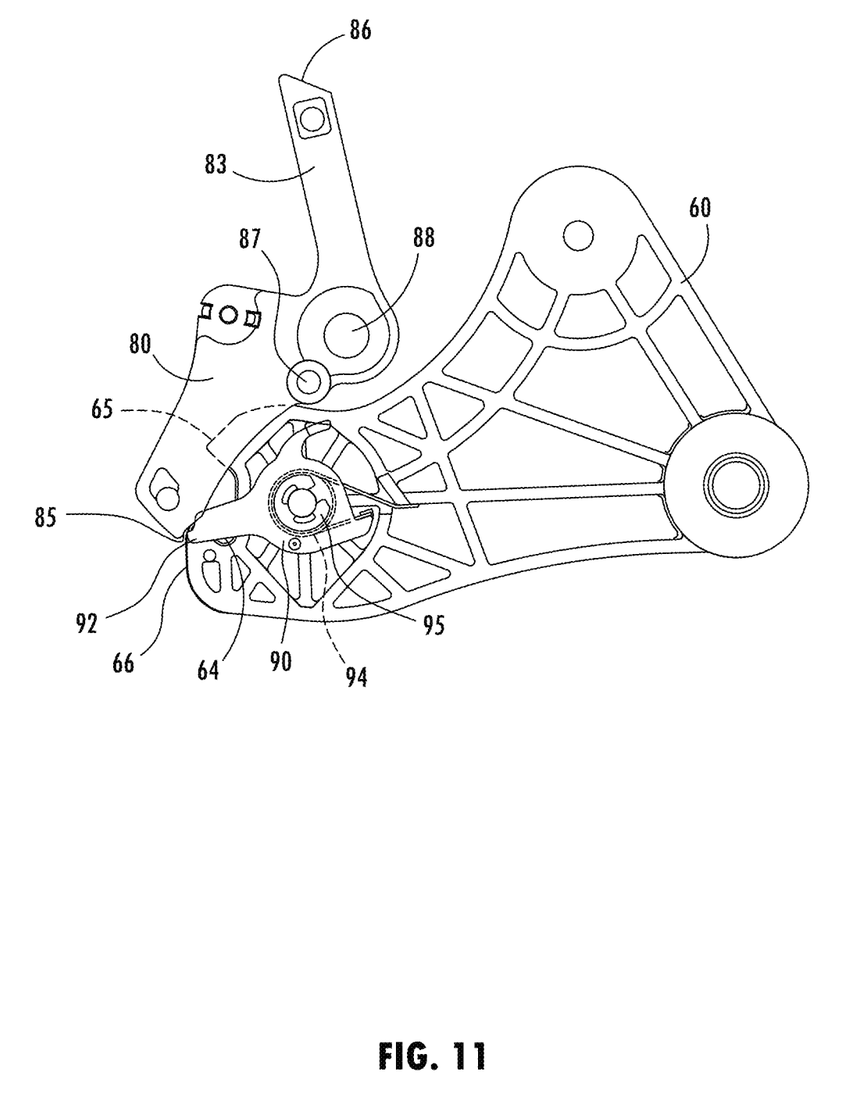
FIG. 11 is a side isometric view of the cable bracket, blocker and toggle cam of the shifter of FIG. 1 when the shift lever is between the neutral and drive positions.
Figure 12:
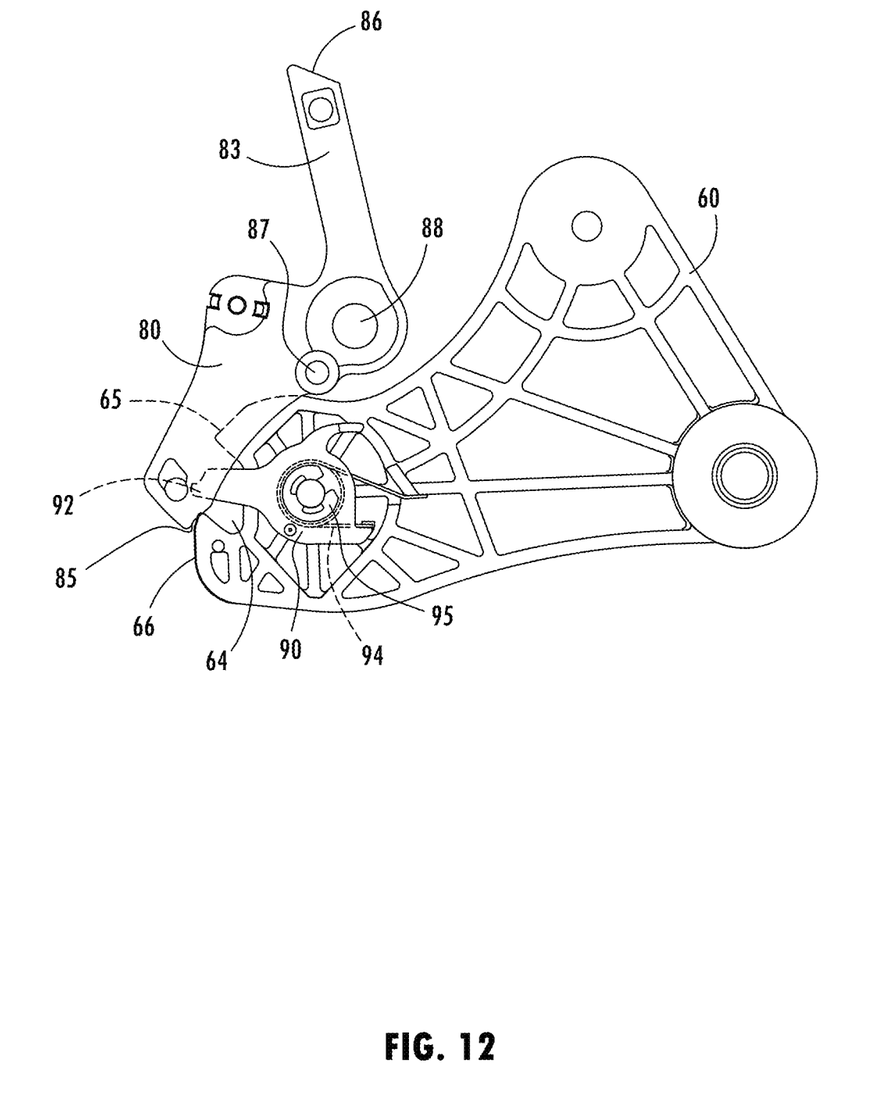
FIG. 12 is a side isometric view of the cable bracket, blocker and toggle cam of the shifter of FIG. 1 when the shift lever is between the neutral and drive positions.
Figure 13:
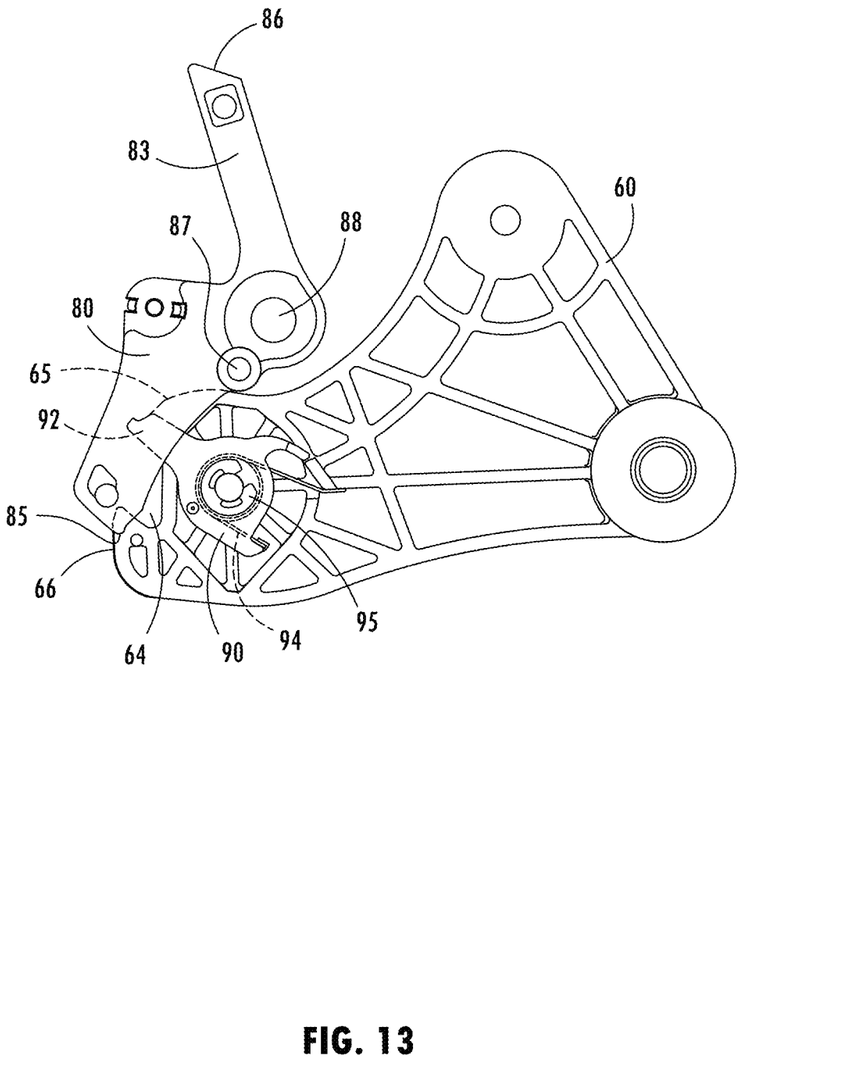
FIG. 13 is a side isometric view of the cable bracket, blocker and toggle cam of the shifter of FIG. 1 when the shift lever is in the drive position.

The toggle cam 90 is biased by a spring 94 into the position shown in FIG. 8. FIG. 9 shows the position of the blocker 80 relative to the cable bracket 60 when the shift lever 12 is in the reverse position where the lower surface 85 of the neutral lock hook 84 rests on the first outer surface 65 and still engages the catch 92 of the toggle cam 90. FIG. 10 shows the position of the blocker 80 relative to the cable bracket 60 when the shift lever 12 is in the neutral position where the lower surface 85 of the neutral lock hook 84 no longer rests on the first outer surface 65, but still engages the catch 92 of the toggle cam 90. If the neutral lock hook 84 was not engaged with the catch 92, the neutral lock hook 84 would otherwise fall into the neutral lock notch 64. If the neutral lock hook 84 falls into the neutral lock notch 64, the solenoid actuator 100 would need to be shut off to move the blocker 80 so as to lift the neutral lock hook 84 from the notch 64 to thereafter allow the shifter 10 to move into the drive position or the reverse position thereby causing a pause in the shifting movement. However, by providing the toggle cam 90, the neutral lock hook 84 will not fall into the notch 64 the first time it is shifted from park to drive. FIGS. 11 and 12 show the positions of the blocker 80 relative to the cable bracket 60 when the shift lever 12 is moved between the neutral position and the drive position. In FIG. 11, the lower surface 85 of the neutral lock hook 84 still engages the catch 92 of the toggle cam 90. Then, as the shift lever 12 moves closer to the drive position, the lower surface 85 of the neutral lock hook 84 slides onto the second outer surface 66 of the cable bracket 60, which moves the lower surface 85 upward thereby releasing the catch 92 of the toggle cam 90 as shown in FIG. 12. Because the toggle cam 90 is spring biased to the position shown in FIG. 8, the toggle cam 90 returns to that position. FIG. 13 shows the position of the blocker 80 relative to the cable bracket 60 when the shift lever 12 is in the drive position where the lower surface 85 of the neutral lock hook 84 rests on the second outer surface 66.

After the initial shift from park to drive is complete, the neutral lock mechanism is then active so that if the vehicle is moving when the driver shifts from drive to neutral (or from reverse to neutral), the neutral lock mechanism will lock the shifter in neutral until the vehicle stops moving, at which time the solenoid actuator 100 will move the blocker 80 to remove the hook 84 from the notch 64. Note that the catch 92 is configured so as to not engage the bottom surface 85 of the hook 84 when moved from neutral to reverse, but rather the hook 84 moves the catch 92 so that it cannot re-engage unless the shifter is returned to park.

In a fail-safe mode, the solenoid actuator 100 no longer receives power, which causes it to extend and move the blocker 80 into the park lock position (or neutral lock release position). This allows the shifter 10 to be shifted to the park position without being locked in neutral. Then when in park, the park lock prevents the shifter lever 12 from moving.

Although the embodiment above is described as using a blocker 80 for performing both the park lock and neutral lock functions, the construction of the neutral lock features are considered novel and may be implemented separate from any park lock mechanism.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, and the length or width of the structures and/or members or other elements of the interface may be varied. It should be noted that the elements of the interface may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A shifter for a vehicle, the shifter comprising:
   a shift lever movable between park, reverse, neutral, and drive positions;
   a bracket that moves in response to the shift lever, the bracket including a neutral lock notch, a first outer surface and a second outer surface on either side of the neutral lock notch;
   a solenoid actuator movable between a first position and a second position;
   a blocker coupled to the solenoid actuator, wherein the solenoid actuator moves the blocker to a park lock position when in the first position whereby the shift lever cannot be moved from the park position, and wherein the solenoid actuator moves the blocker to a park lock release position when in the second position whereby the shift lever can be moved from the park position, the blocker comprising a neutral lock hook having a surface that, when the blocker is in the park lock release position, moves along the first outer surface and the second outer surface of the bracket and that selectively falls into the neutral lock notch to selectively prevent shifting out of the neutral position; and
   a toggle cam coupled to the bracket for rotating between a first location proximate the first outer surface of the bracket and a second location proximate the second outer surface of the bracket, the toggle cam comprising a catch for engaging the surface of the neutral lock hook as it slides on the first outer surface of the bracket towards the neutral lock notch as the shift lever is moved from the park position through the reverse position towards the neutral position so as to prevent the neutral lock hook from sliding into the neutral lock notch, wherein when the shift lever is shifted to the drive position, the neutral lock hook slides onto the second outer surface of the bracket thereby releasing the toggle cam to return to the first location.

2. The shifter of claim 1, wherein the toggle cam is configured to only prevent the neutral lock hook from engaging the neutral lock notch when the shift lever is shifted from the park position to the drive position, while allowing the neutral lock hook to engage the neutral lock notch when the shift lever is shifted from the drive position to the neutral position or from the reverse position to the neutral position.

3. The shifter of claim 2, wherein the solenoid actuator is controlled to remove the neutral lock hook from the neutral lock notch when the vehicle stops moving to allow shifting to the drive position or the reverse position from the neutral position.

4. The shifter of claim 1, wherein the blocker is mounted so as to pivot between the park lock position and the park lock release position responsive to the solenoid actuator.

5. The shifter of claim 1, wherein the toggle cam is spring biased toward the first location.

6. The shifter of claim 1, wherein the bracket is a cable bracket and the vehicle shifter further comprises a lever bracket and a linkage coupled to the cable bracket, the lever bracket being secured to the shift lever and coupled to the linkage so as to cause movement of the cable bracket in response to movement of the shift lever.

7. The shifter of claim 1, wherein the solenoid actuator moves from the first position to the second position when a brake of the vehicle is actuated, wherein the solenoid actuator moves from the second position to the first position when the vehicle is not moving.

8. A shifter for a vehicle, the shifter comprising:
   a shift lever movable between park, reverse, neutral, and drive positions;
   a bracket that moves in response to the shift lever, the bracket including a neutral lock notch, a first outer surface and a second outer surface on either side of the neutral lock notch;
   a solenoid actuator movable between a first position and a second position;
   a blocker coupled to the solenoid actuator, wherein the solenoid actuator moves the blocker to a neutral lock release position when in the first position, and wherein the solenoid actuator moves the blocker to a neutral lock position when in the second position, the blocker comprising a neutral lock hook having a surface that, when the blocker is in the neutral lock position, moves along the first outer surface and the second outer surface of the bracket and that selectively falls into the neutral lock notch to selectively prevent shifting out of the neutral position; and a toggle cam coupled to the bracket for rotating between a first location proximate the first outer surface of the bracket and a second location proximate the second outer surface of the bracket, the toggle cam comprising a catch for engaging the surface of the neutral lock hook as it slides on the first outer surface of the bracket towards the neutral lock notch as the shift lever is moved from the park position through the reverse position towards the neutral position so as to prevent the neutral lock hook from sliding into the neutral lock notch, wherein when the shift lever is shifted to the drive position, the neutral lock hook slides onto the second outer surface of the bracket thereby releasing the toggle cam to return to the first location.

9. The shifter of claim 8, wherein the toggle cam is configured to only prevent the neutral lock hook from engaging the neutral lock notch when the shift lever is shifted from the park position to the drive position, while allowing the neutral lock hook to engage the neutral lock notch when the shift lever is shifted from the drive position to the neutral position or from the reverse position to the neutral position.

10. The shifter of claim 9, wherein the solenoid actuator is controlled to remove the neutral lock hook from the neutral lock notch when the vehicle stops moving to allow shifting to the drive position or the reverse position from the neutral position.

11. The shifter of claim 8, wherein the neutral lock release position is also a park lock position whereby the shift lever cannot be moved from the park position, and wherein the neutral lock position is a park lock release position whereby the shift lever can be moved from the park position.

12. The shifter of claim 8, wherein the toggle cam is spring biased toward the first location.

13. The shifter of claim 8, wherein the bracket is a cable bracket and the vehicle shifter further comprises a lever bracket and a linkage coupled to the cable bracket, the lever bracket being secured to the shift lever and coupled to the linkage so as to cause movement of the cable bracket in response to movement of the shift lever.

14. The shifter of claim 8, wherein the solenoid actuator moves from the first position to the second position when a brake of the vehicle is actuated, wherein the solenoid actuator moves from the second position to the first position when the vehicle is not moving.

15. A shifter for a vehicle, the shifter comprising:
a shift lever movable between park, reverse, neutral, and drive positions;
a cable bracket that moves in response to the shift lever, the cable bracket including a neutral lock notch, a first outer surface and a second outer surface on either side of the neutral lock notch;
a solenoid actuator movable between a first position and a second position, wherein the solenoid actuator moves from the first position to the second position when a brake of the vehicle is actuated, wherein the solenoid actuator moves from the second position to the first position when vehicle is not moving;
a blocker coupled to the solenoid actuator, wherein the solenoid actuator moves the blocker to a park lock position when in the first position whereby the shift lever cannot be moved from the park position, and wherein the solenoid actuator moves the blocker to a park lock release position when in the second position whereby the shift lever can be moved from the park position, wherein the blocker is mounted so as to pivot between the park lock position and the park lock release position responsive to the solenoid actuator, the blocker comprising a neutral lock hook having a surface that, when the blocker is in the park lock release position, moves along the first outer surface and the second outer surface of the bracket and that selectively falls into the neutral lock notch to selectively prevent shifting out of the neutral position; and a toggle cam coupled to the bracket for rotating between a first location proximate the first outer surface of the bracket and a second location proximate the second outer surface of the bracket, the toggle cam comprising a catch for engaging the surface of the neutral lock hook as it slides on the first outer surface of the bracket towards the neutral lock notch as the shift lever is moved from the park position through the reverse position towards the neutral position so as to prevent the neutral lock hook from sliding into the neutral lock notch, wherein when the shift lever is shifted to the drive position, the neutral lock hook slides onto the second outer surface of the bracket thereby releasing the toggle cam to return to the first location.

16. The shifter of claim 15, wherein the toggle cam is configured to only prevent the neutral lock hook from engaging the neutral lock notch when the shift lever is shifted from the park position to the drive position, while allowing the neutral lock hook to engage the neutral lock notch when the shift lever is shifted from the drive position to the neutral position or from the reverse position to the neutral position.

17. The shifter of claim 16, wherein the solenoid actuator is controlled to remove the neutral lock hook from the neutral lock notch when the vehicle stops moving to allow shifting to the drive position or the reverse position from the neutral position.

18. The shifter of claim 15, wherein the toggle cam is spring biased toward the first location.

19. The shifter of claim 15 further comprising a lever bracket and a linkage coupled to the cable bracket, the lever bracket being secured to the shift lever and coupled to the linkage so as to cause movement of the cable bracket in response to movement of the shift lever.

20. The shifter of claim 19, wherein the neutral lock release position is also a park lock position whereby the shift lever cannot be moved from the park position, and wherein the neutral lock position is a park lock release position whereby the shift lever can be moved from the park position.

* * * * *